United States Patent
Sato

(10) Patent No.: US 11,142,027 B2
(45) Date of Patent: Oct. 12, 2021

(54) PNEUMATIC TIRE

(71) Applicant: Sumitomo Rubber Industries, Ltd., Kobe (JP)

(72) Inventor: Hana Sato, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 997 days.

(21) Appl. No.: 15/787,854

(22) Filed: Oct. 19, 2017

(65) Prior Publication Data
US 2018/0126802 A1 May 10, 2018

(30) Foreign Application Priority Data
Nov. 4, 2016 (JP) .............................. JP2016-216504

(51) Int. Cl.
- B60C 15/06 (2006.01)
- B60C 15/00 (2006.01)
- B60C 5/14 (2006.01)

(52) U.S. Cl.
CPC ...... B60C 15/0607 (2013.01); B60C 15/0009 (2013.01); B60C 15/0635 (2013.01); B60C 15/0653 (2013.01); B60C 2005/145 (2013.01); B60C 2015/009 (2013.01); B60C 2015/061 (2013.01); B60C 2200/06 (2013.01); Y10T 152/10837 (2015.01)

(58) Field of Classification Search
CPC ............ B60C 15/0607; B60C 15/0635; B60C 2015/061; B60C 2015/009; B60C 15/0603; B60C 15/0625; B60C 15/06; B60C 15/0009; B60C 15/00; Y10T 152/10837

USPC ................................................. 152/546, 541
See application file for complete search history.

(56) References Cited

FOREIGN PATENT DOCUMENTS

| | | | |
|---|---|---|---|
| DE | 10 2010 016 007 A1 | * | 9/2011 |
| DE | 10 2014 211 525 A1 | * | 12/2015 |
| JP | 2005008071 A | * | 1/2005 |
| JP | 2008-37367 A | | 2/2008 |
| JP | 2008062759 A | * | 3/2008 |
| JP | 2010006322 A | * | 1/2010 |
| JP | 2010254245 A | * | 11/2010 |
| JP | 2014118069 A | * | 6/2014 |

OTHER PUBLICATIONS

English machine translation of JP 2005-8071 A, Jan. 13, 2005.*

* cited by examiner

Primary Examiner — Adrienne C. Johnstone
(74) Attorney, Agent, or Firm — Birch, Stewart, Kolasch & Birch, LLP

(57) ABSTRACT

A pneumatic tire 1 comprises a carcass 6 comprising a carcass ply (6A) comprising a main body portion (6a) and turned up portions (6b), and bead apex rubbers 8. Each of the bead apex rubbers 8 comprises a first rubber portion 10 and a second rubber portion 11 provided on an outer side in a tire axial direction of the first rubber portion and having smaller rubber hardness than the first rubber portion. A ratio H1/H2 of a height (H1) of an outer end (10e) in a tire radial direction of the first rubber portion 10 from a bead base line (BL) and a height (H2) of an outer end in the tire radial direction of each of the turned up portions (6b) from the bead base line (BL) is in a range of from 1.4 to 1.7.

2 Claims, 3 Drawing Sheets

PNEUMATIC TIRE

TECHNICAL FIELD

The present invention relates to a pneumatic tire with improved durability.

BACKGROUND ART

As shown in FIG. 3, a pneumatic tire (a) comprising bead cores (b), a carcass (c) formed of a carcass ply (c1) turned up around each of the bead cores (b), and bead apex rubbers (d) each arranged between the turned up portions of the carcass ply (c1) around each of the bead cores (b) is known. The carcass (c) includes a main body portion (ca) extending between the bead cores (b) of bead portions (f) through a tread portion (not shown) via side wall portions (e), and turned up portions (cb) each turned up around corresponding one of the bead cores (b) from an inner side to an outer side in a tire axial direction. Each of the bead apex rubbers (d) includes a first rubber portion (da) and a second rubber portion (db) disposed on the outer side of the first rubber portion (da) in the tire axial direction and having rubber hardness lower than that of the first rubber portion (da). In such a pneumatic tire (a), for example, Japanese Unexamined Patent Application Publication No. 2008-37367 has disclosed a configuration for achieving both ride comfort performance and steering stability by setting height (h1) of the first rubber portion (da) from a bead base line (BL) in a tire radial direction to be in a range of from 40% to 60% of height (h) of the bead apex rubber (d) from the bead base line (BL) in the tire radial direction.

However, the conventional pneumatic tire (a) has not been configured in consideration of compressive stress applied to outer ends in the tire radial direction of the turned up portions (cb) of the carcass ply (c1) and movement of the outer ends. For example, when bending deformation is caused repeatedly on the bead portions during running, the outer ends of the turned up portions (cb) moves due to distortion thereof. Thereby, it is possible that not only concave portions (g) recessed inwardly in the tire axial direction are formed on outer surfaces of the bead portions (f) as shown by an imaginary line in FIG. 3, but also durability deteriorates. By increasing the rubber hardness of the second rubber portion (db), it is possible to suppress the distortion of the outer ends due to the repeated bending deformation, but the compressive stress applied to the outer ends of the turned up portions (cb) is not decreased, therefore, it is possible that the durability deteriorates.

SUMMARY OF THE INVENTION

The present invention was made in view of the above, and a primary object thereof is to provide a pneumatic tire having improved durability by improving the height in the tire radial direction of the first rubber portion, which has high rubber hardness, of the bead apex rubber and height in the tire radial direction of the turned up portion of the carcass ply.

In one aspect of the present invention, a pneumatic tire comprises a carcass comprising a carcass ply comprising a main body portion extending between a pair of bead cores of bead portions via a tread portion and sidewall portions and a pair of turned up portions each turned up around respective one of the bead cores from an inside to an outside in a tire axial direction, and a pair of bead apex rubbers each extending outwardly in a tire radial direction between the main body portion and respective one of the turned up portions, each of the bead apex rubbers comprising a first rubber portion and a second rubber portion provided on an outer side in the tire axial direction of the first rubber portion and having smaller rubber hardness than the first rubber portion, and in a standard state in which the pneumatic tire is mounted on a standard rim, inflated to an standard pressure, and loaded with no tire load, a ratio H1/H2 of a height H1 of an outer end in the tire radial direction of the first rubber portion from a bead base line and a height H2 of an outer end in the tire radial direction of each of the turned up portions from the bead base line being in a range of from 1.4 to 1.7.

In another aspect of the invention, it is preferred that the pneumatic tire further comprises a pair of bead reinforcing layers each extending around respective one of the bead cores along the carcass ply in a substantially U-shaped manner in a cross section thereof, wherein each of the bead reinforcing layers comprises an inner portion extending on an inner side in the tire axial direction of the main body portion and an outer portion extending on the outer side in the tire axial direction of corresponding one of the turned up portions, and a ratio Ta/T1 of thickness (Ta) in the tire axial direction of the first rubber portion and thickness (T1) in the tire axial direction of the bead apex rubber at a position of the outer end in the tire radial direction of the turned up portion is smaller than a ratio Tb/T2 of thickness (Tb) in the tire axial direction of the first rubber portion and thickness (T2) in the tire axial direction of the bead apex rubber at a position of an outer end in the tire radial direction of the outer portion.

In another aspect of the invention, it is preferred that the ratio Ta/T1 is in a range of from 0.45 to 0.55, and the ratio Tb/T2 is in a range of from 0.70 to 0.80.

In another aspect of the invention, it is preferred that a ratio (Ta/T1)/(Tb/T2) of the ratio Ta/T1 and the ratio Tb/T2 is in a range of from 0.60 to 0.70.

DESCRIPTION OF THE PREFERRED EMBODIMENT

An embodiment of the present invention will now be described in detail.

Figure 1:
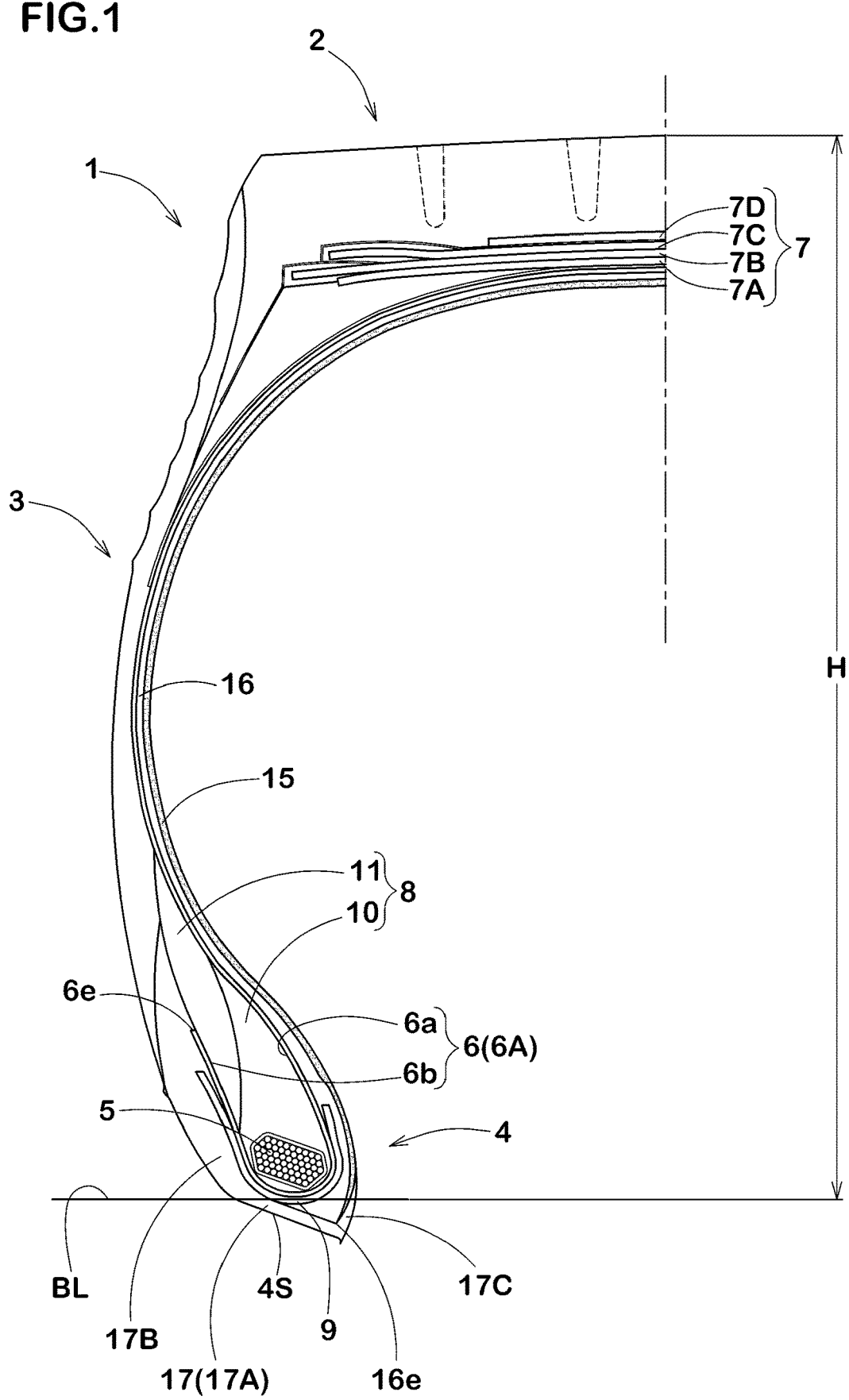
FIG. 1 is a tire meridian cross section of a pneumatic tire according to one embodiment of the present invention.

FIG. 1 is a tire meridian cross section of a pneumatic tire (hereinafter may be simply referred to as "tire") 1 according to one embodiment of the present invention in a standard state. The present invention is applied to tires for passenger cars, and in particular is suitably applied to heavy-duty tires for trucks, buses, and the like.

In this specification, the "standard state" is a state in which the tire is mounted on a standard rim (not shown), inflated to a standard pressure, and loaded with no tire load, and dimensions and the like of various parts of the tire are values measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The tire 1 in this embodiment includes a carcass 6, a belt layer 7, a pair of bead apex rubbers 8, and a pair of bead reinforcing layers 9.

The carcass 6 extends between the bead cores 5 of the bead portion 4 through the tread portion 2 and the sidewall portions 3. The carcass 6 comprises at least one, one in this embodiment, carcass ply 6A. The carcass ply 6A includes a main body portion (6a) which extends in a toroidal manner between a pair of bead cores 5, and a turned up portions (6b) extending from both sides of the main body portion 6a and each turned up around the bead core 5 from an inside to an outside in a tire axial direction. The carcass ply 6A includes carcass cords arranged at an angle in a range of from 75 to 90 degrees with respect to a tire equator (C), for example. Organic fiber cords or steel cords are used as the carcass cords, for example.

Outer end (6e) in a tire radial direction of each of the turned up portions (6b) in this embodiment overlaps respective one of the bead portions 4, more specifically respective one of the bead apex rubbers 8 in the tire radial direction, that is the overlapping portion extends in the tire radial direction.

The belt layer 7 is disposed on an outer side of the carcass 6 in the tire axial direction and inside the tread portion 2. The belt layer 7 comprises at least two belt plies, four belt plies 7A to 7D stacked in the tire radial direction in this embodiment. The belt ply 7A disposed at the innermost side in the tire radial direction is arranged at an angle in a range of from 45 to 75 degrees with respect to the tire equator C, for example. Each of the belt plies 7B to 7D disposed radially outside the belt ply 7A is arranged at an angle in a range of from 10 to 35 degrees with respect to the tire equator C, for example. Each of the belt plies 7A to 7D is overlapped in a direction in which the belt cords intersects each other, for example. It is preferred that the belt cords of the belt plies 7A to 7D have high elasticity such as steel cords.

The bead core 5 has a ring shape formed by winding a steel bead wire, for example, and has a laterally-long flat hexagonal cross-sectional shape in this embodiment. An inner surface of the bead core 5 in the tire radial direction extends along a bead bottom surface 4S, therefore, fitting force with a rim is increased over a wide range.

Figure 2:
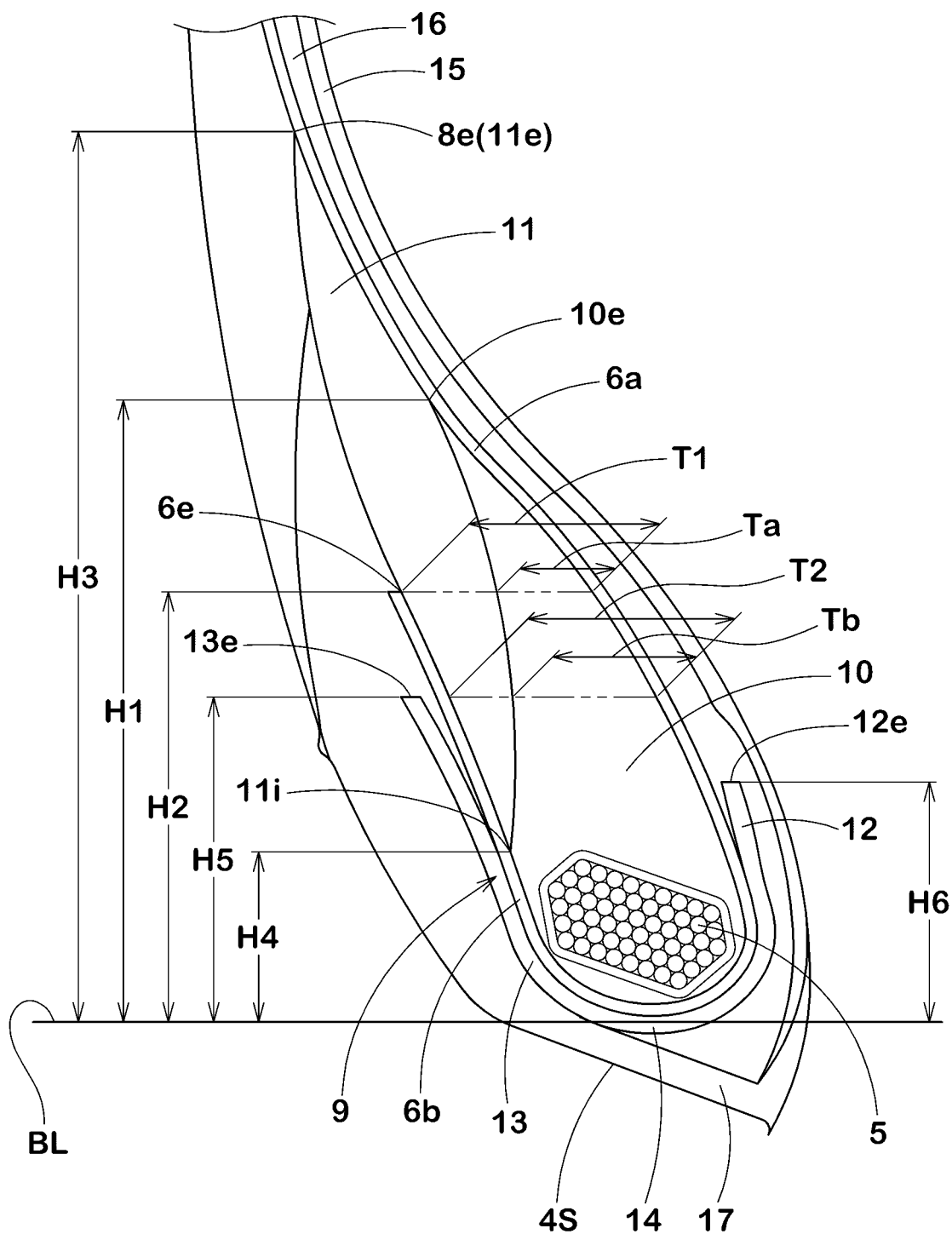
FIG. 2 is an enlarged view of a bead portion of FIG. 1.
Figure 3:
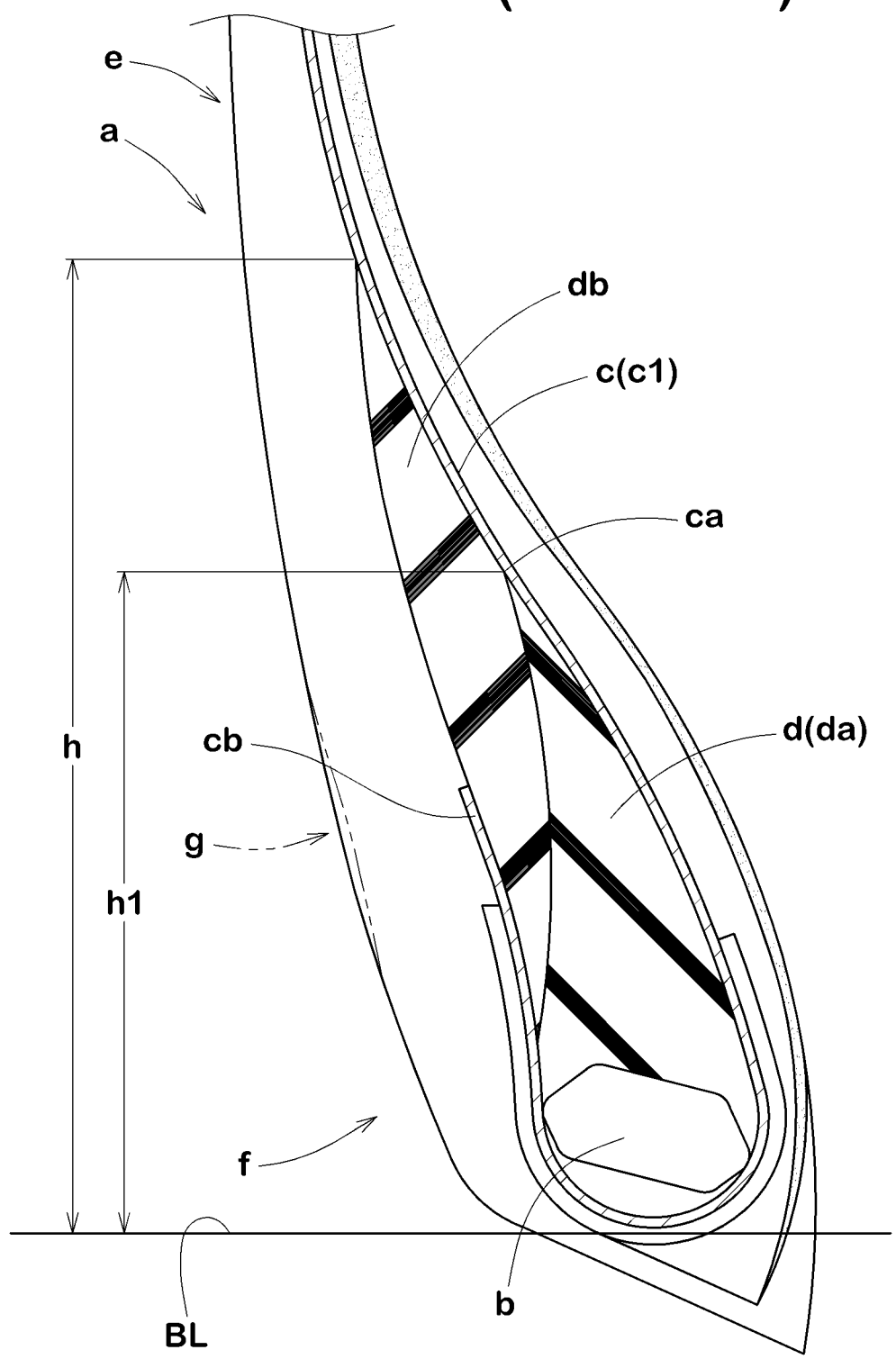
FIG. 3 is a tire meridian cross section of a conventional pneumatic tire.

As shown in FIG. 2, each of the bead apex rubbers 8 includes a first rubber portion 10 and a second rubber portion 11 disposed on the outer side of the first rubber portion 10 in the tire axial direction and having rubber hardness smaller than that of the first rubber portion 10. As the bead portions 4 deform, the bead apex rubbers 8 configured as such moderate compressive stress applied to the turned up portions (6b) of the carcass ply 6A while maintaining sufficient bending rigidity, therefore, durability of the bead portions 4 is effectively improved.

Generally, tensile force applied to the main body portion (6a) of the carcass 6 is larger than the tensile force applied to the turned up portion (6b). In this embodiment, the first rubber portion 10 having high rubber hardness is provided on the inner side in the tire axial direction where the main body portion (6a) is disposed, therefore, deflection of the bead portion 4 is effectively decreased and thereby it is possible that the durability is increased.

A ratio H1/H2 of height H1 of an outer end (10e) of the first rubber portion 10 in the tire radial direction from a bead base line (BL) and height H2 of the outer end (6e) of the turned up portion (6b) in the tire radial direction from the bead base line (BL) is in a range of from 1.4 to 1.7. If the ratio H1/H2 is less than 1.4, the ratio of the second rubber portion 11 having smaller rubber hardness than the first rubber portion 10 is excessively increased at a position in the tire radial direction of the outer end (6e) of the turned up portion (6b). Thereby, a large movement is generated at the outer end (6e) of the turned up portion (6b) due to deformation, therefore, the durability is deteriorated. If the ratio H1/H2 is greater than 1.7, the ratio of the second rubber portion 11 having smaller rubber hardness than the first rubber portion 10 is excessively decreased at the position in the tire radial direction of the outer end (6e) of the turned up portion (6b). Thereby, the compressive stress applied to the outer end (6e) of the turned up portion (6b) cannot be moderated and thus damage occurs, therefore, the durability is deteriorated. In the tire 1 in this embodiment, as the ratio H1/H2 is set to be in a range of from 1.4 to 1.7, distribution of the first rubber portion 10 and the second rubber portion 11 is optimized, the deformation of the outer end (6e) of the turned up portion (6b) is decreased, and the compressive stress applied to the outer end (6e) is moderated, therefore, the durability is improved.

It is preferred that rubber hardness (Ha) of the first rubber portion 10 is in a range of from 80 to 95 degrees, for example. It is preferred that rubber hardness (Hb) of the second rubber portion 11 is in a range of from 50 to 70 degrees, for example. If the rubber hardness (Ha) of the first rubber portion 10 is less than 80 degrees, necessary bead rigidity is not maintained, therefore, it is possible that the durability is deteriorated. If the rubber hardness (Ha) of the first rubber portion 10 is greater than 95 degrees, the bead rigidity is excessively increased, and the compressive stress applied to the outer end (6e) of the turned up portion (6b) cannot be moderated, therefore, it is possible that damage occurs. Further, if the rubber hardness (Hb) of the second rubber portion 11 is less than 50 degrees, it is possible that the bead rigidity is decreased. If the rubber hardness (Hb) of the second rubber portion 11 is greater than 70 degrees, it is possible that the compressive stress applied to the outer end (6e) of the turned up portion (6b) is not moderated.

In order to exert the above-described effect more effectively, it is preferred that a difference (Ha−Hb) in the rubber hardness between the first rubber portion 10 and the second rubber portion 11 is in a range of from 10 to 40 degrees. In this specification, "rubber hardness" is rubber hardness measured by a type-A durometer under an environment of 23 degrees Celsius according to Japanese Industrial standard JIS-K6253.

It is preferred that height (H3) of an outer end (8e) of the bead apex rubber 8 in the tire radial direction from the bead base line (BL) is in a range of from 1.2 to 1.6 times the height (H1) of the outer end (10e) of the first rubber portion 10. Thereby, while the bead rigidity is maintained high, the compressive stress applied to the outer end (6e) of the turned up portion (6b) is effectively moderated, therefore, the durability of the bead portion 4 is increased.

In order to exert the above-described effect more effectively, it is preferred that the height (H1) of the outer end (10e) of the first rubber portion 10 is in a range of from 15% to 30% of a tire section height H (shown in FIG. 1).

It is preferred that height (H4) of an inner end (11i) of the second rubber portion 11 in the tire radial direction from the bead base line (BL) is in a range of from 20% to 35% of the height (H1) of the outer end (10e) of the first rubber portion 10, for example. Thereby, the compressive stress applied to the outer end (6e) of the turned up portion (6b) is effectively moderated.

The bead reinforcing layer 9 extends around the bead core 5 along the carcass ply 6A in a substantially u-shaped manner in a cross section thereof. The bead reinforcing layer 9 in this embodiment includes an inner portion 12 extending on an inner side in the tire axial direction of the main body portion (6a), an outer portion 13 extending on an outer side in the tire axial direction of the turned up portion (6b), and a bottom piece portion 14 extending between the inner portion 12 and the outer portion 13 through an inner side in the tire radial direction of the bead core 5.

The bead reinforcing layer 9 in this embodiment comprises a cord ply in which steel reinforcing cords are arranged at an angle of, for example, in a range of from 15 to 60 degrees with respect to the tire equator C. The bead reinforcing layers 9 strongly reinforce the bead portions 4.

A part around an outer end (12e) in the tire radial direction of the inner portion 12, to which a large tensile stress is applied during running, is protected by the main body portion (6a) and the first rubber portion 10. Further, at an outer end (13e) in the tire radial direction of the outer portion 13, an inward force in the tire radial direction is likely to be applied due to missing of the carcass ply. Therefore, the outer end (12e) of the inner portion 12 is disposed on the inner side in the tire radial direction of the outer end (13e) of the outer portion 13 so as to improve the durability while maintaining tire mass small.

If height (H6) of the outer end (12e) of the inner portion 12 from the bead base line (BL) is excessively smaller than height (H5) of the outer end (13e) of the outer portion 13 from the bead base line (BL), large bending return force is applied to the inner portion 12, and the inner portion 12 separates from the main body portion (6a). Thereby, it is possible that the bead rigidity is decreased. From such a viewpoint, it is preferred that the height (H6) of the outer end (12e) of the inner portion 12 is in a range of from 60% to 90% of the height (H5) of the outer end (13e) of the outer portion 13.

It is preferred that the height (H5) of the outer end (13e) of the outer portion 13 is smaller than the height (H2) of the outer end (6e) of the turned up portion (6b). Thereby, even when the tire is deformed during running, the compressive stress applied to the outer end (13e) of the outer portion 13 is maintained small, therefore, damage is suppressed. If the height (H5) of the outer end (6e) of the turned up portion (6b) is excessively small, the rigidity of the bead portion is decreased. From this viewpoint, it is preferred that the height (H5) of the outer end (13e) of the outer portion 13 from the bead base line (BL) is in a range of from 60% to 90% of the height (H2) of the outer end (6e) of the turned up portion (6b).

A ratio of thickness (Ta) in the tire axial direction of the first rubber portion 10 and thickness (T1) of the bead apex rubber 8 in the tire axial direction at the position of the outer end (6e) in the tire radial direction of the turned up portion (6b) is defined as a ratio Ta/T1 of rubber thickness of the turned up portion (6b) A ratio of thickness (Tb) in the tire axial direction of first rubber portion 10 and thickness (T2) in the tire axial direction of the bead apex rubber 8 at a position of the outer end (13e) of the outer portion 13 in the tire radial direction is defined as a ratio Tb/T2 of rubber thickness of the outer portion 13. In the tire 1 in this embodiment, it is preferred that the ratio Ta/T1 of the rubber thickness of the turned up portion (6b) is smaller than the ratio Tb/T2 of the rubber thickness of the outer portion 13.

Thereby, rubber volume of the first rubber portion 10 and the second rubber portion 11 is further effectively distributed. Therefore, the movement of the outer end (6e) of the turned up portion (6b) and the outer end (13e) of the outer portion 13 becomes small, the occurrence of deformation of the bead portion 4 can be suppressed, and the compression stress applied to the outer end (6e) of the turned up portion (6b) can be moderated. As described above, in this embodiment, by setting the ratio of the rubber thickness of the first rubber portion 10 in the tire radial direction at both of the outer ends (13e) and (6e), the compressive stress applied to both of the outer ends (13e) and (6e) is moderated while the deformation at both of the outer ends (13e) and (6e) is suppressed, therefore, the durability is improved in a good balance.

It is preferred that the ratio Ta/T1 of the rubber thickness of the turned up portion (6b) is in a range of from 0.45 to 0.55. It is preferred that the ratio Tb/T2 of the rubber thickness of the outer portion 13. If the ratio Ta/T1 of the rubber thickness of the turned up portion (6b) is less than 0.45, it is possible that the movement of the outer end (6e) of the turned up portion (6b) due to the deformation thereof cannot be suppressed. If the ratio Ta/T1 of the rubber thickness of the turned up portion (6b) is greater than 0.55, it is possible that the compressive stress applied to the outer end (6e) of the turned up portion (6b) cannot be moderated. If the ratio Tb/T2 of the rubber thickness of the outer portion 13 is less than 0.70, it is possible that the deformation of the outer end (6e) of the turned up portion (6b) and the outer end (13e) of the outer portion 13 cannot be suppressed. If the ratio Tb/T2 of the rubber thickness of the outer portion 13 is greater than 0.80, it is possible that the compressive stress applied to the outer end (6e) of the turned up portion (6b) and the outer end (13e) of the outer portion 13 cannot be moderated.

In order to exert the above effect further effectively, it is preferred that a ratio (Ta/T1)/(Tb/T2) of the ratio Ta/T1 and the ratio Tb/T2 is in a range of from 0.60 to 0.70.

Further, as shown in FIG. 1, the tire 1 in this embodiment includes an inner liner layer 15, an insulation rubber 16, and a chafer rubber 17.

The inner liner layer 15 extends continuously between the bead portions 4 along the carcass 6. The inner liner layer 15 is made of, for example, air impermeable rubber such as butyl-based rubber. The inner liner layer 15 in this embodiment has radially inner ends which terminate on the radially inner sides of the bead base line (BL). Thereby, pressure of air inside a tire cavity of the tire is maintained high.

The insulation rubber 16 is disposed between the inner liner layer 15 and the carcass 6. The insulation rubber 16 increases adhesive force between the inner liner layer 15 and the carcass 6, therefore, delamination thereof is prevented.

The insulation rubber 16 extends in the tire radial direction in contact with the inner liner layer 15 over the entire length of the inner liner layer 15. Radially inner ends (16e) of the insulation rubber 16 terminate on the inner sides in the tire axial direction of the outer portions 13 of the bead reinforcing layer 9.

The chafer rubber 17 is disposed on the inner side in the tire radial direction of the bead reinforcing layer 9. The chafer rubber 17 includes a base portion 17A, an outer raised portion 17B, and an inner raised portion 17C. The base portion 17A is exposed at the bead bottom surface 4S. The outer raised portion 17B is connected with the base portion 17A and extends radially outwardly on the outer side in the tire axial direction. The inner raised portion 17C is connected with the base portion 17A and extends radially outwardly on the inner side in the tire axial direction in a tapered shape.

While detailed description has been made of the pneumatic tire as an embodiment of the present invention, the present invention can be embodied in various forms without being limited to the illustrated embodiment.

Working Example (Example)

Heavy-duty tires of size 11.00820 having the basic structure shown in FIG. 1 were made by way of test according to the specification listed in Table 1, and then each of the test tires was tested for the durability. Note that the common specifications are as follows.
<Bead Apex Rubber>
(First Rubber Portion)
  Rubber hardness: 87 degrees
  Ratio (H1/H) of the radial height (H1) of the outer end and the tire section height (H): 27%
(Second Rubber Portion)
  Rubber hardness: 60 degrees
  Ratio (H3/H1) of the radial height (H3) of the outer end and the radial height (H1): 1.4 times
  Ratio (H4/H1) of the radial height (H4) of the inner end and the radial height (H1): 27%
<Bead Reinforcing Layer>
  Ratio (H5/H2) of the radial height (H5) of the outer end of the outer portion and the radial height (H2): 75%
  Ratio (H6/H5) of the radial height (H6) of the outer end of the inner portion and the radial height (H5): 75%
Test methods are as follows.
<Durability (Bead Damage)>
  Each of the test tires was mounted on a rim, then run on a drum testing machine under the following conditions, and the running time until damage occurred in the bead was measured. The results are indicated by an index based on the reference 1 being 100, wherein the larger the numerical value, the better the durability is.
  Rim: 8.5×20
  Tire pressure: 800 kPa (all wheels)
  Longitudinal load: 94 kN
  Speed: 20 km/h <Durability (Bead Deformation Amount)>
  Each of the test tires was mounted on a rim, then run on the drum testing machine under the following conditions, and a deformation amount in the tire axial direction was measured at three points on a surface of the tire before and after the run. Before the run, it was measured in a 5% pressure state in which the tire was inflated to 5% of the standard pressure. After the run, it was measured in a standard pressure state in which the tire was inflated to the standard pressure and loaded with no tire load.
  Rim: 8.5×20
  Tire pressure: 800 kPa (all wheels)
  Longitudinal load: 37.6 kN
  Speed: 80 km/h
  Running distance: 50,000 km
  Measurement position 1: the position of the radially outer end of the first rubber portion of the bead apex rubber
  Measurement position 2: the position of the radially outer end of the turned up portion of the carcass
  Measurement position 3: the position of the radially outer end of the outer portion of the bead reinforcing layer
  Evaluation was made in the following manner; the deformation amount before and after the run at the measurement position 1 is denoted as (a), the deformation amount before and after the run at the measurement position 2 is denoted as (b), and the deformation amount before and after the run at the measurement position 3 is denoted as (c); each of the test tires was scored according to the following expressions,
  if (a)=(b)=(c), the score is 1,
  if (a)=(b)≠(c), the score is 2,
  if (a)≠(b)≠(c), the score is 3
wherein the tires with an evaluation point (score) "1" or "2" are graded as "good", and the tires with the evaluation point "3" are graded as "unacceptable". Not that if a difference of the deformation amounts between (a), (b), and (c) is less than 1 mm, they are treated as the same deformation amount.
  The test results are shown in Table 1.

TABLE 1

| (1/2) | | | | | | | |
|---|---|---|---|---|---|---|---|
| | Ref. 1 | Ref. 2 | Ex. 1 | Ex. 2 | Ex. 3 | Ex. 4 | Ex. 5 |
| Height H1 of First rubber portion/Height H2 of Turned up portion | 1.3 | 1.8 | 1.5 | 1.4 | 1.7 | 1.5 | 1.5 |
| Ta/T1 | 0.5 | 0.5 | 0.5 | 0.5 | 0.5 | 0.5 | 0.4 |
| Tb/T2 | 0.75 | 0.75 | 0.75 | 0.75 | 0.75 | 0.5 | 0.75 |
| (Ta/T1)/(Tb/T2) | 0.67 | 0.67 | 0.67 | 0.67 | 0.67 | 1.00 | 0.53 |
| Durability (Bead damage) [index: larger value is better] | 100 | 95 | 105 | 107 | 103 | 100 | 100 |
| Durability (Bead deformation amount) [evaluation point: larger value is better] | 3 | 1 | 1 | 2 | 1 | 2 | 2 |

| (2/2) | | | | | | | |
|---|---|---|---|---|---|---|---|
| | Ex. 6 | Ex. 7 | Ex. 8 | Ex. 9 | Ex. 10 | Ex. 11 | Ex. 12 |
| Height H1 of First rubber portion/Height H2 of Turned up portion | 1.5 | 1.5 | 1.5 | 1.5 | 1.5 | 1.5 | 1.5 |
| Ta/T1 | 0.45 | 0.55 | 0.60 | 0.5 | 0.5 | 0.5 | 0.5 |
| Tb/T2 | 0.75 | 0.75 | 0.75 | 0.65 | 0.70 | 0.8 | 0.85 |
| (Ta/T1)/(Tb/T2) | 0.60 | 0.73 | 0.80 | 0.77 | 0.71 | 0.63 | 0.59 |
| Durability (Bead damage) [index: larger value is better] | 104 | 103 | 102 | 100 | 102 | 103 | 101 |
| Durability (Bead deformation amount) [evaluation point: larger value is better] | 1 | 1 | 1 | 2 | 1 | 1 | 1 |

From the test results, it can be confirmed that the performance of the tires as the examples is effectively improved compared with the tires as the references. In addition, tires of a different size from the above and tires provided with the first rubber portion having the rubber hardness in a range of from 80 to 95 degrees and the second rubber portion having the rubber hardness in a range of from 50 to 70 degrees were also tested, the same trend was indicated.

The invention claimed is:

1. A pneumatic tire comprising:
    a pair of bead portions and a carcass comprising a carcass ply, the carcass ply comprising a main body portion extending between a pair of bead cores, one bead core in each of the pair of bead portions, via a tread portion and sidewall portions, the carcass ply further comprising a pair of turned up portions each turned up around a respective one of the bead cores from an inside to an outside in a tire axial direction,
    a pair of bead reinforcing layers each extending around a respective one of the bead cores along the carcass ply in a cross section thereof,
    a pair of bead apex rubbers each extending outwardly in a tire radial direction between the main body portion and respective one of the turned up portions,
    each of the bead apex rubbers comprising a first rubber portion and a second rubber portion provided on an outer side in the tire axial direction of the first rubber portion and having smaller rubber hardness than the first rubber portion, and
    each of the bead reinforcing layers comprises an inner portion extending on an inner side in the tire axial direction of the main body portion and an outer portion extending on the outer side in the tire axial direction of a respective one of the turned up portions, the part of each bead apex rubber axially between the main body portion of the carcass ply and the respective turned up portion thereof consisting of the first rubber portion and the second rubber portion,
    wherein
    in a standard state in which the pneumatic tire is mounted on a standard rim, inflated to an standard pressure, and loaded with no tire load, a ratio $H1/H2$ of a height $H1$ of an outermost end in the tire radial direction of each first rubber portion from a bead base line and a height $H2$ of an outermost end in the tire radial direction of each of the turned up portions from the bead base line being in a range of from 1.4 to 1.7,
    a ratio $Ta/T1$ of thickness $Ta$ in the tire axial direction of each first rubber portion and thickness $T1$ in the tire axial direction of each bead apex rubber at a position of the outermost end in the tire radial direction of the respective turned up portion is smaller than a ratio $Tb/T2$ of thickness $Tb$ in the tire axial direction of each first rubber portion and thickness $T2$ in the tire axial direction of each bead apex rubber at a position of the outermost end in the tire radial direction of the outer portion, and
    a ratio $(Ta/T1)/(Tb/T2)$ of the ratio $Ta/T1$ and the ratio $Tb/T2$ is in a range of from 0.60 to 0.70.

2. The pneumatic tire according to claim 1, wherein the ratio $Ta/T1$ is in a range of from 0.45 to 0.55, and the ratio $Tb/T2$ is in a range of from 0.70 to 0.80.

* * * * *